United States Patent
Collier et al.

(10) Patent No.: US 9,127,560 B2
(45) Date of Patent: Sep. 8, 2015

(54) COOLED TURBINE BLADE AND METHOD FOR COOLING A TURBINE BLADE

(75) Inventors: Matthew Durham Collier, Simpsonville, SC (US); Anthony Louis Giglio, Simpsonville, SC (US); Gayathri Puram, Karnataka (IN)

(73) Assignee: General Electric Company, Schenectady, NY (US)

( * ) Notice: Subject to any disclaimer, the term of this patent is extended or adjusted under 35 U.S.C. 154(b) by 347 days.

(21) Appl. No.: 13/308,927

(22) Filed: Dec. 1, 2011

(65) Prior Publication Data

US 2013/0142649 A1    Jun. 6, 2013

(51) Int. Cl.
*F01D 5/08* (2006.01)
*F01D 5/18* (2006.01)
*F01D 5/22* (2006.01)

(52) U.S. Cl.
CPC ............. *F01D 5/187* (2013.01); *F01D 5/225* (2013.01); *F05D 2260/201* (2013.01); *F05D 2260/204* (2013.01); *F05D 2260/205* (2013.01); *F05D 2260/2214* (2013.01); *Y02T 50/673* (2013.01); *Y02T 50/676* (2013.01)

(58) Field of Classification Search
CPC ........... F01D 5/00; F01D 5/187; F01D 5/188; F01D 5/225; F01D 5/18; F05D 2260/20
USPC ............. 415/115, 116; 416/96 R, 97 R, 97 A, 416/90 R, 92
See application file for complete search history.

(56) References Cited

U.S. PATENT DOCUMENTS

| | | | |
|---|---|---|---|
| 3,606,574 A | 9/1971 | Brands et al. | |
| 6,318,963 B1 | 11/2001 | Emery et al. | |
| 6,325,593 B1 | 12/2001 | Darkins, Jr. et al. | |
| 6,431,833 B2 | 8/2002 | Jones | |
| 7,568,882 B2 | 8/2009 | Brittingham et al. | |
| 7,632,071 B2 | 12/2009 | Charbonneau et al. | |
| 7,722,326 B2 | 5/2010 | Beeck et al. | |
| 7,976,278 B1 | 7/2011 | Liang | |
| 7,997,866 B2 | 8/2011 | Naik et al. | |
| 8,052,390 B1 | 11/2011 | Liang | |
| 2001/0048878 A1* | 12/2001 | Willett et al. | 416/97 R |
| 2006/0056969 A1* | 3/2006 | Jacala et al. | 416/97 R |

FOREIGN PATENT DOCUMENTS

JP    10317905 A    12/1998

OTHER PUBLICATIONS

Office Action regarding related CN App. No. 201210507002.0; dated Mar. 27, 2015; 14 pages.

* cited by examiner

*Primary Examiner* — Edward Look
*Assistant Examiner* — Maxime Adjagbe

(57) ABSTRACT

A cooled turbine blade comprises a root for fixing the blade to rotor, an airfoil extending along a radial axis from the root, and a tip shroud disposed at a radially outward end of the airfoil. The tip shroud extends in a circumferential direction from the airfoil and defines, within itself, a core plenum and a peripheral plenum. The airfoil defines an aft airfoil cooling passage that extends radially through the airfoil proximate a trailing edge portion of the airfoil. The airfoil also defines an aft cooling inlet for providing an aft stream of cooling fluid to the aft airfoil cooling passage. The airfoil also defines at least one aft cooling exit for discharging the aft stream of cooling fluid from the aft airflow cooling passage to the peripheral plenum. The tip shroud defines at least one peripheral plenum vent for discharging the aft stream of cooling fluid.

16 Claims, 5 Drawing Sheets

COOLED TURBINE BLADE AND METHOD FOR COOLING A TURBINE BLADE

BACKGROUND OF THE INVENTION

The subject matter disclosed herein relates to a blade for a turbine, such as in an aircraft engine, a gas turbine engine, a steam turbine, etc. More specifically, the present invention relates to the cooling of a turbine blade tip shroud.

A gas turbine engine comprises a turbine section wherein hot compressed gas is expanded to produce rotating shaft power. The turbine section often comprises a plurality of alternating rows of stationary vanes (nozzles) and rotating blades (buckets). Each rotating blade has an airfoil and a root that attaches the rotating blade to a rotor.

In some cases, an integral tip shroud is included on the radially outward end of each turbine blade so that, when assembled, a set of blades create an outer surface for constraining the passage of the hot compressed gases through the airfoil sections of the blades. The incorporation of integral tip shrouds tends to increase the ability of a turbine section to extract work from the hot compressed gases, improving performance of the turbine engine. Unfortunately, integral tip shrouds on rotating airfoils are highly stressed due to the mechanical and aerodynamic forces, and the high temperature environment, to which they are subjected.

To improve the useful design life of a turbine blade, cooling methods are employed. Traditionally, blade cooling is accomplished by extracting a portion of the compressed working fluid (e.g., air) from the compressor and passing it directly to the turbine section without exposing the cooling fluid to the addition of heat in the combustor section. This cooling fluid provides a source of pressurized and relatively cool fluid, which readily flows through passages formed in the turbine blades and provides cooling thereto. Thus, radial passages are often provided to carry cooling fluid radially outwardly from a root of the blade to a blade's tip where the cooling fluid is discharged.

Accordingly, those skilled in the art seek a turbine blade with improved cooling for airfoil trailing edge and tip shroud.

BRIEF DESCRIPTION OF THE INVENTION

According to one aspect of the invention, a cooled turbine blade comprises a root for fixing the blade to a turbine rotor, an airfoil extending along a radial axis from the root, and a tip shroud disposed at a radially outward end of the airfoil. The tip shroud extends in a circumferential direction from the airfoil and defines, within itself, a core plenum and a peripheral plenum. The airfoil defines an aft airfoil cooling passage that extends radially through the airfoil proximate a trailing edge portion of the airfoil. The airfoil also defines an aft cooling inlet for providing an aft stream of cooling fluid to the aft airfoil cooling passage. The airfoil also defines at least one aft cooling exit for discharging the aft stream of cooling fluid from the aft airfoil cooling passage to the peripheral plenum. The tip shroud defines at least one peripheral plenum vent for discharging the aft stream of cooling fluid from the peripheral plenum.

According to another aspect of the invention, a method for cooling a turbine blade having an airfoil and a tip shroud extending in a circumferential direction from a tip of the airfoil is provided. The method comprises providing both a core plenum and a peripheral plenum in the tip shroud and separating a supply of cooling fluid into a core cooling stream and a peripheral cooling stream. The peripheral cooling stream is directed through an aft airfoil cooling passage extending radially through the airfoil proximate a trailing edge portion of the airfoil so as to transfer heat from the trailing edge portion of the airfoil to the peripheral cooling stream. The core cooling stream is directed through one or more core airfoil cooling passages extending through a core section of the airfoil so as to transfer heat from the core section to the core cooling stream. The peripheral cooling stream from the aft airfoil cooling passage to the peripheral plenum, and the core cooling stream is directed from the one or more core airfoil cooling passages to the core plenum. The peripheral cooling stream is discharged from the peripheral plenum, and the core cooling stream is discharged from the core plenum.

The method also includes providing the aft stream of cooling fluid to the aft airfoil cooling passage though the aft cooling inlet and discharging the stream of cooling fluid from the peripheral plenum through at least one peripheral plenum vent.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
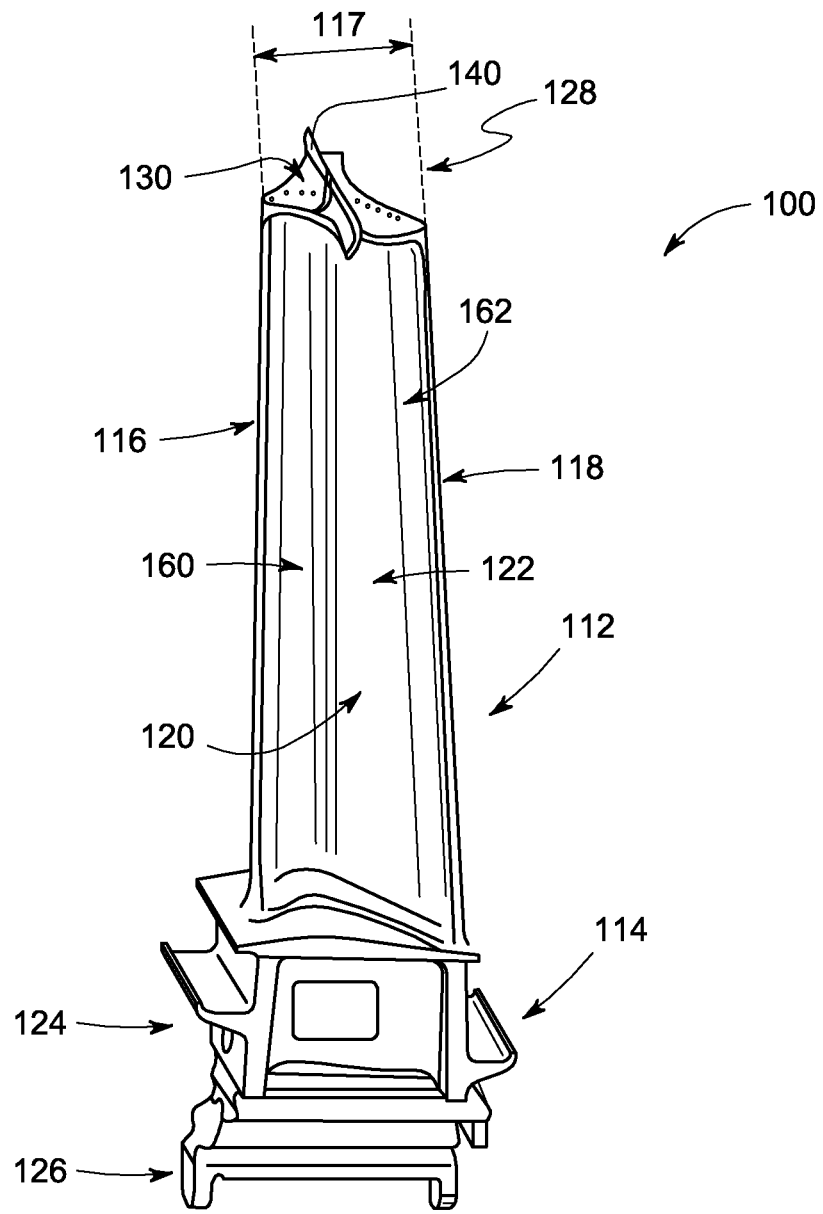
FIG. 1 is a drawing of an exemplary cooled turbine blade.

As shown in FIG. 1, a turbine blade 100 comprises an airfoil 112 and a root 114. The airfoil 112 extends along a radial axis from the root 114 to a blade tip 130. The airfoil 112 has a leading edge portion 116 and a trailing edge portion 118, and the distance from the leading edge to the trailing edge defines an airfoil chord length 117. A generally concave pressure surface 120 and a generally convex suction surface 122 extend between the leading and trailing edges on opposing sides of the airfoil 112. In the illustrated example, the root 114 of blade 100 comprises a shank 124 and a dovetail 126 to engage a corresponding dovetail groove on a rotor, enabling turbine blade 100 to be secured to the rotor.

Figure 2:
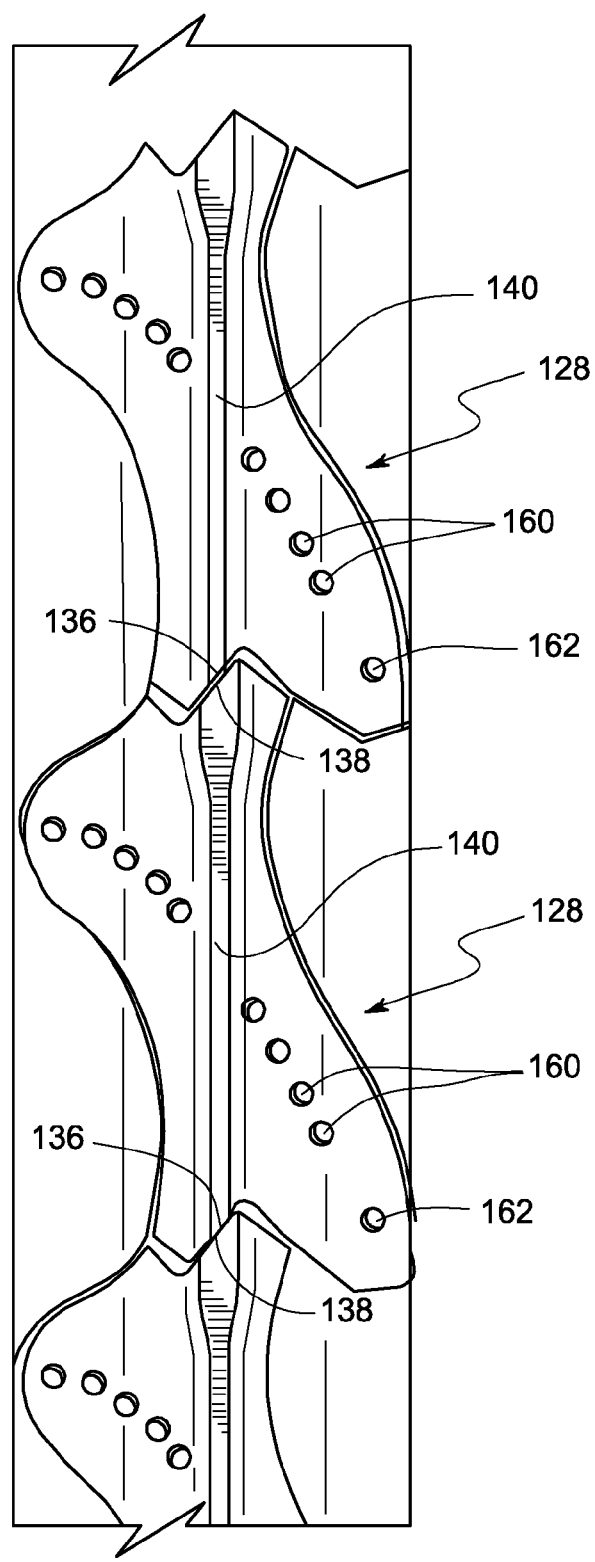
FIG. 2 is a top view of an exemplary cooled turbine blade.

As shown in FIGS. 1 and 2, a tip shroud 128 is disposed at the blade tip 130, i.e., positioned adjacent to the radially outward end of the airfoil 112, and extending in a circumferential direction (i.e., in a direction that is substantially perpendicular to the radial axis) from the airfoil 112. The tip shroud 128 has a radially inward facing surface and radially outward facing surface, both surfaces being exposed to the hot compressed gas flowing through the turbine section. Each tip shroud 128 has bearing surfaces 136, 138, over which it contacts bearing surfaces of an adjacent tip shroud of an adjacent blade. One or more baffle(s) 140 extend radially outwardly from the tip shroud 128 to prevent leakage of hot gas around the blade.

Figure 3:
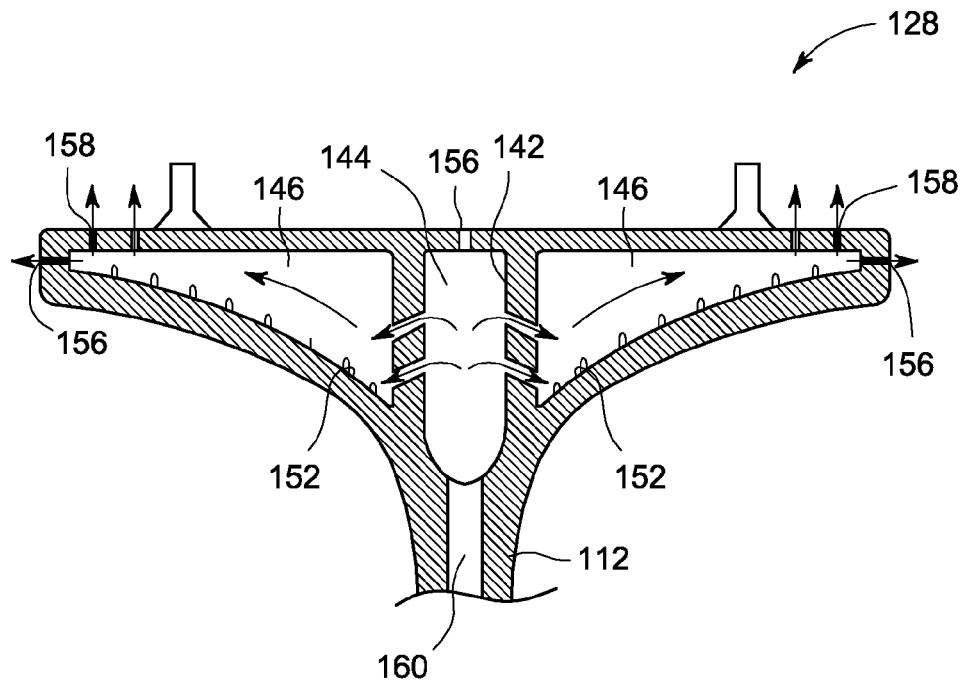
FIG. 3 is a cross-sectional view of an exemplary embodiment of the invention.
Figure 4:
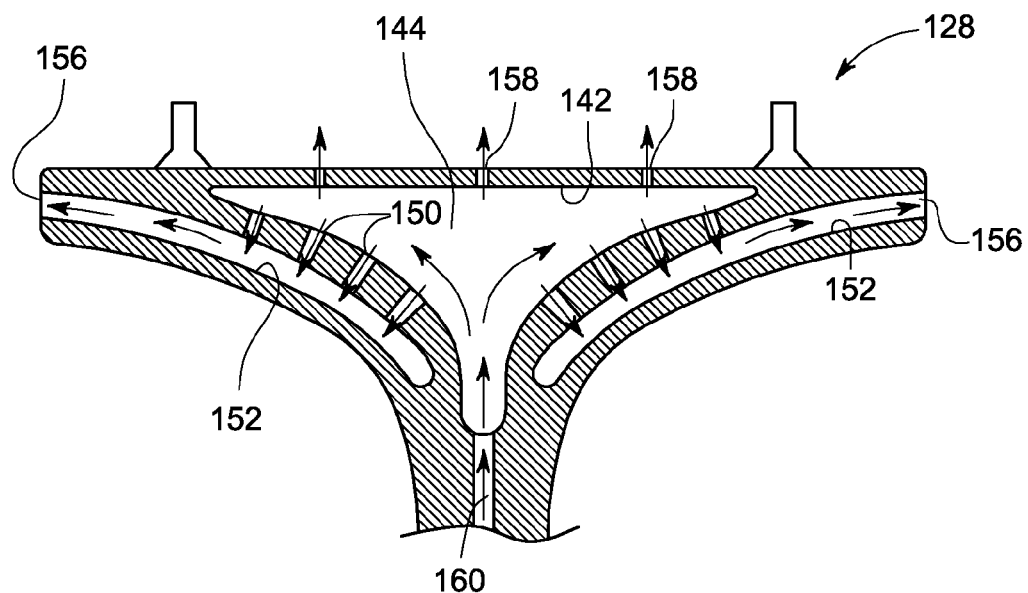
FIG. 4 is a cross-sectional view of another exemplary embodiment of the invention.

As shown in FIG. 1, one or more core airfoil cooling passages 160 extend through a core section (e.g., within a distance that is less than about 25 percent of the airfoil chord length from the center of the airfoil) of airfoil 112, and an aft airfoil cooling passage 162 extends through a trailing edge portion of airfoil 112. One or more core airfoil cooling passages 160 and aft airfoil cooling passage 162, extend radially from the root 114, where they each receive a stream of pressurized cooling fluid (which may comprise compressed air or another fluid collected from a compressor section of an engine in which the turbine blade is installed), to the blade tip 130, where the streams of cooling fluid may be directed to a location to be cooled or may otherwise be exhausted or discharged. For example, as shown in FIGS. 3 and 4, localized, directional impingement cooling in tip shroud 128 is used for reducing the material (e.g., metal or ceramic) temperatures in highly stressed regions of the tip shroud. More specifically, the tip shroud 128 includes an internal core cooling chamber 142 that provides cooling fluid to desired areas and enables impingement cooling of the tip shroud 128. The aft airfoil cooling passage 162 may have a cross-sectional shape that is configured to conform to an external shape of the trailing edge portion of the airfoil 112.

The radial cooling passages, chambers, plenums and cooling passages described herein may be formed using a number of processes such as electro-chemical drilling. One such form of electrochemical drilling is known as shaped tube electrolytic machining (STEM) and enables machining where the depth to diameter ratio of the formed passage is relatively large, such as in the case of turbine blade radial cooling passages. STEM drilling produces passages by anodic dissolution using tubular cathodes with an insulating exterior coating. The STEM process can produce passages having varying diameters along the length of the passage.

In addition to variation along the length of the passage, STEM drilling can also produce passages with cross sections that are not round. For example, an initial section of a cooling passage may be drilled by displacing the electrode radially into the turbine blade under conditions that produce a round passage with a clearance distributed uniformly around the electrode. Subsequently, the electrode may be moved in a direction transverse to the longitudinal axis of the electrode (i.e., toward one side of the wall of the passage). Additional material will then be removed from that side of the wall of the passage, thus producing a passage with a cross section that is eccentric. The process can be repeated in different directions to produce a passage with a desired cross section.

Figure 5:
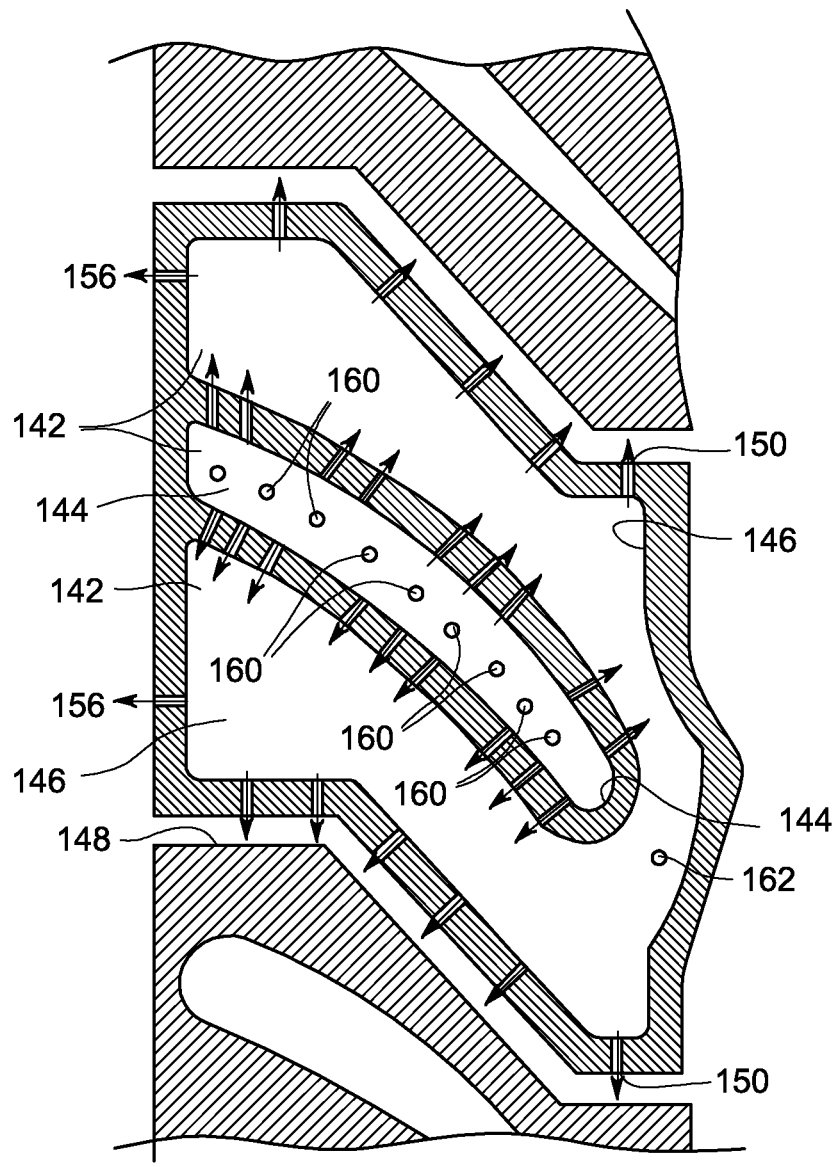
FIG. 5 is a plan view of the FIG. 3 structure according to a first exemplary embodiment.

As shown in FIG. 5, the internal core cooling chamber 142 includes both a core plenum 144 and a peripheral plenum 146 defined by the tip shroud 128. The core airfoil cooling fluid passages 160 extend radially through the airfoil 112 into the tip shroud 128 and intersect the core plenum 144. An aft airfoil cooling passage 162 is positioned close to the trailing edge of the blade, and this aft cooling passage 162 intersects the peripheral plenum 146 rather than the core plenum 144. According to this exemplary embodiment, cooling fluid that has passed through aft airfoil cooling passage 162 pressurizes peripheral plenum 146 as apposed to the core plenum 144. In the illustrated embodiment, cooling air that has pressurized the peripheral plenum 146 may be vented through one or more peripheral plenum vent 156. It would be noted, however, that alternative embodiments provide fluid communication between the core plenum and the peripheral plenum. In accordance with such alternative embodiments, venting from the core plenum 144 into the main gas stream may reduce or eliminate the need for venting from the peripheral plenum 146 into the main gas stream, such as through a peripheral plenum vent 156.

Figure 6:
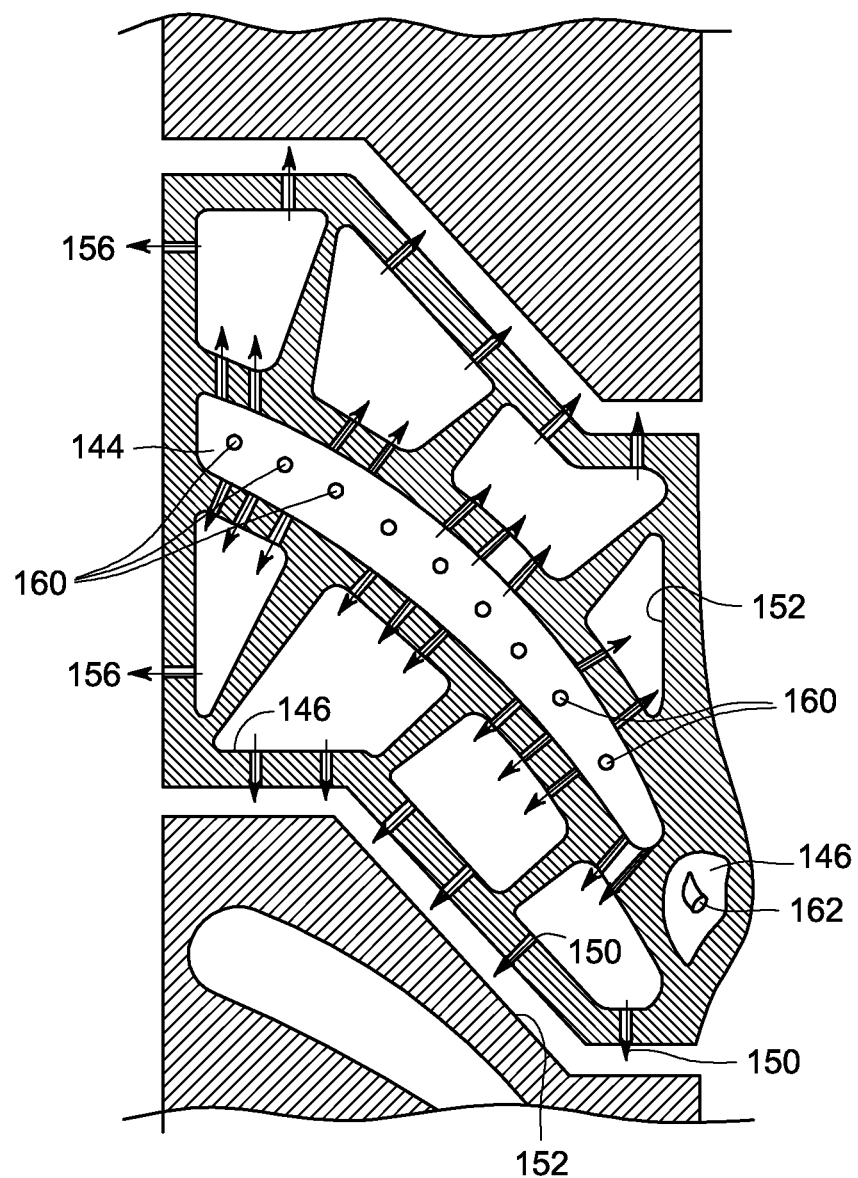
FIG. 6 is a plan view of the FIG. 3 structure according to a second exemplary embodiment.

As shown in FIG. 5, the aft airfoil cooling passage 162 has a cross-sectional shape that is round. It should be appreciated, however, that the aft airfoil cooling passage may also have a cross-sectional shape that more closely conforms to the exterior shape of the airfoil, thereby satisfying requirements for a minimum wall thickness while also being positioned in relatively close proximity to the trailing edge of the airfoil and providing a desired cross-sectional area to accommodate the desired quantity and/or velocity of the stream of cooling fluid. For example, as shown in FIG. 6, an exemplary cross-sectional shape for the aft airfoil cooling passage 162 includes a first wall that is substantially parallel to one outer surface of the airfoil and a second wall is substantially parallel to a different outer surface of the airfoil. Accordingly, aft airfoil cooling passage 162 is configured to satisfy requirements for a minimum wall thickness while providing improved cooling for the trailing edge of airfoil.

As a result, in accordance with this embodiment, the aft airfoil cooling passage 162 is able to be positioned proximate the trailing edge of the airfoil (e.g., within a distance that is less than about 25 percent of the airfoil chord length from the airfoil trailing edge), thereby reducing material operating temperatures and improving creep capability. By pressurizing the peripheral plenum 146 rather than the core plenum 144, the placement of aft airfoil cooling passage 162 effectively isolates the hotter fluid of aft airfoil cooling passage 162 within the peripheral plenum 146, away from the core plenum 144, enabling the hotter fluid to then be forced into a region of the tip shroud requiring less cooling and/or having higher load carrying capability and enabling the cooling fluid within the core plenum 144 to be cooler and to be applied to regions of the tip shroud requiring greater cooling and/or having lower load carrying capabilities. The resulting reduction in operating temperature of the tip shroud structure provides an increase in useful part life and/or allows the same part to operate in a hotter environment without a detriment to useful life.

In accordance with the invention, impingement cooling may be created in the tip shroud by directing cooling fluid from the aft airfoil cooling passage or from the one or more core airfoil cooling passages through one or more impingement aperture so as to form one or more stream of impingement cooling fluid directed toward a target surface. The one or more impingement aperture may be formed as an integral part of the blade and may be cast in the part or may be created by machining after the casting is formed. Examples of impingement cooling that targets the airfoil-to-shroud fillet in an integral impingement bridge are shown in FIGS. 3 and 4. FIG. 3 depicts impingement cooling directed into the cooling chamber 142, which is mostly open. FIG. 4 depicts impingement cooling into a cooling chamber 142 that bears the shape of a narrow channel. The narrower channel of FIG. 4 provides increased velocity of the cooling fluid, and consequently improved heat transfer downstream of the impingement zone. It is to be appreciated, however, that other impingement/flow configurations may be provided.

Referring to the schematic cross-sectional view of FIG. 3, in an exemplary embodiment, the core plenum 144 comprises a sealed or mostly sealed chamber housed inside, and defined by, the tip shroud 128. The core plenum 144 receives pressurized cooling fluid from the one or more core airfoil cooling passage 160 within the airfoil 112, providing a stream of pressurized impingement cooling fluid. In an exemplary embodiment, this core plenum 144 is sealed sufficiently (i.e., venting is sufficiently limited) such that the core plenum 144 may be pressurized by the one or more core airfoil cooling passages 160. Thus, in a conventional manner, fluid is taken into the blade, e.g., near the dovetail or shank area, flows through the shank and into and along the airfoil 112 toward the tip shroud 128.

In the illustrated example of FIG. 3, the fluid flows from the airfoil into the pressurized core plenum 144 inside the tip shroud 128. The fluid is then forced from the pressurized chamber through at least one impingement aperture 150, and directed at a desired location (i.e., an impingement zone 152, such as an aft target surface or wall of the tip shroud) inside the tip shroud 128. FIG. 3 represents an embodiment of tip shroud impingement cooling in which the airfoil to shroud fillet is the target impingement zone. However, impingement apertures may be directed to impingement zones at other tip shroud locations. As will be appreciated, impingement cooling provides a form of heat transfer for a localized region as compared with more generalized streams flowing in a channel. The embodiment of FIG. 3 further provides turbulators within the cooling chamber(s) 142 (e.g., in the fillet region) to further enhance heat transfer to the cooling fluid. In an exemplary embodiment, a total cross-sectional area of the impingement apertures is smaller than that of the one or more core airfoil cooling passages 160. As a result, the core plenum 144 is pressurized. While this provides superior impingement heat transfer, it is not required. It is possible for the total area of the impingement apertures to be larger than that of the one or more core airfoil cooling passage area and have the impingement still function, albeit at a reduced performance.

The post-impingement fluid flows from the impingement zone 152 through cooling chamber(s) 148 to one or more peripheral plenum vent 156, 158 and into the main gas stream. Cooling fluid may also exit at peripheral plenum vent 156, directly from cooling chamber 142. Although at least one cooling chamber 142 is illustrated in the FIG. 3 embodiment, it is to be understood that it would be possible to have the airfoil coolant passage(s) serve as this plenum. The impingement apertures would then originate from the airfoil coolant passage and direct coolant to outer chamber(s) of the turbine blade.

Referring now to the schematic cross-sectional view of FIG. 4, in another exemplary embodiment, a core plenum 144, which is sealed or mostly sealed and housed inside tip shroud 128, is utilized so that the impingement cooling through impingement apertures 150 is directed over an impingement zone 152 that may be larger than that of the FIG. 3 embodiment. Furthermore, the post impingement cooling fluid is channeled through cooling chambers 142, which provide channel flow heat transfer downstream of impingement zone 152. The exhaust cooling fluid then flows to one or more peripheral plenum vent 156, and into the main gas stream. Cooling fluid may also exit at peripheral plenum vent 156, directly from cooling chamber 142. Even further, in any of the above embodiments, post impingement cooling fluid could also exit through the surface on which it is impinging via film holes. Thus, the fluid is not required to flow through the cooling chamber after impingement.

Two potential top views of the structure shown in FIG. 3 are schematically illustrated in FIGS. 5 and 6. In FIG. 5, the impingement apertures 150 flow into connected cooling chambers 142. FIG. 6 illustrates a second potential embodiment wherein adjacent cooling chambers 142 are not connected. As will be appreciated, any number of chambers 142 and impingement apertures 150 may be utilized and the chambers may be isolated or connected as deemed necessary or desirable, for example to provide channel flow downstream of the impingement zone(s).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A cooled turbine blade comprising:
a root for fixing the cooled turbine blade to a turbine rotor;
an airfoil extending along a radial axis from the root, the airfoil defining a single aft airfoil cooling passage that extends radially through the airfoil proximate a trailing edge portion of the airfoil, wherein the single aft airfoil cooling passage is located within a distance of a trailing edge that is less than 25 percent of the airfoil chord length; and
a tip shroud disposed at a radially outward end of the airfoil, extending in a circumferential direction from the airfoil, and defining, within the tip shroud, a core plenum and a peripheral plenum;
the airfoil defining an aft cooling inlet for providing a single aft stream of cooling fluid to the single aft airfoil cooling passage and defining a single aft cooling exit for discharging the single aft stream of cooling fluid from the aft airfoil cooling passage to the peripheral plenum, wherein an entire amount of the single aft stream directly routed to the peripheral plenum is routed through the single aft airfoil cooling passage;
the tip shroud defining at least one peripheral plenum vent for discharging the single aft stream of cooling fluid from the peripheral plenum; and
one or more core airfoil cooling passages defined by the airfoil, each of the one or more core airfoil cooling passages extending radially through a core section of the airfoil, the airfoil defining a core cooling inlet for providing a core stream of cooling fluid to the one or more core airfoil cooling passages and defining at least one core cooling exit for discharging the core stream of cooling fluid from the one or more core airfoil cooling passages to the core plenum, wherein the aft cooling passage and the one or more core airfoil cooling passages are positioned to route the aft stream of cooling fluid and the core stream of cooling fluid to distinct plenums, wherein the one or more core airfoil cooling passages are located within a distance of a center of the airfoil that is less than 25 percent of the airfoil chord length.

2. A cooled turbine blade as in claim 1, the tip shroud defining at least one core plenum impingement aperture for forming a stream of impingement cooling fluid and directing it from the core plenum toward a target surface.

3. A cooled turbine blade as in claim 1, the tip shroud defining at least one peripheral plenum impingement aperture for forming a stream of impingement cooling fluid and directing it from the peripheral plenum toward a target surface.

4. A cooled turbine blade as in claim 1, wherein the aft airfoil cooling passage has a cross-sectional shape that is round.

5. A cooled turbine blade as in claim 1, wherein the single aft airfoil cooling passage has a cross-sectional shape that is configured to conform to an external shape of the trailing edge portion of the airfoil.

6. A cooled turbine blade as in claim 5, wherein a first wall of the single aft airfoil cooling passage is substantially parallel to a pressure surface of the trailing edge portion of the airfoil, and a second wall of the aft airfoil cooling passage is substantially parallel to a suction surface of the trailing edge portion of the airfoil.

7. A cooled turbine blade as in claim 2, wherein a total cross-sectional area of the at least one core cooling exit is greater than a total cross-sectional area of the at least one core plenum impingement aperture.

8. A cooled turbine blade as in claim 3, wherein a total cross-sectional area of the single aft cooling exit is greater than a total cross-sectional area of the at least one peripheral plenum impingement aperture.

9. A cooled turbine blade as in claim 2, wherein the target surface comprises an inner wall of a fillet between the airfoil and the tip shroud.

10. A cooled turbine blade as in claim 3, wherein the target surface comprises an inner wall of a fillet between the airfoil and the tip shroud.

11. A cooled turbine blade as in claim 1, wherein the tip shroud has a bearing surface for engaging another tip shroud of another cooled turbine blade.

12. A cooled turbine blade as in claim 11, wherein the at least one peripheral plenum vent is disposed adjacent to the bearing surface.

13. A method for cooling a turbine blade having an airfoil and a tip shroud extending in a circumferential direction from a tip of the airfoil, the method comprising:
   providing both a core plenum and a peripheral plenum in the tip shroud;
   separating a supply of cooling fluid into a core cooling stream and a peripheral cooling stream;
   directing the single peripheral cooling stream through a single aft airfoil cooling passage extending radially through the airfoil proximate a trailing edge portion of the airfoil so as to transfer heat from the trailing edge portion of the airfoil to the peripheral cooling stream, wherein the aft airfoil cooling passage is located within a distance of a trailing edge that is less than 25 percent of the airfoil chord length;
   directing the core cooling stream through one or more core airfoil cooling passages extending through a core section of the airfoil so as to transfer heat from the core section to the core cooling stream, wherein the one or more core airfoil cooling passages are located within a distance of a center of the airfoil that is less than 25 percent of the airfoil chord length;
   directing the single peripheral cooling stream from the single aft airfoil cooling passage to the peripheral plenum;
   directing the core cooling stream from the one or more core airfoil cooling passages to the core plenum;
   pressurizing the peripheral plenum with the single peripheral cooling stream for isolating the single peripheral cooling stream from the core plenum;
   discharging the single peripheral cooling stream from the peripheral plenum; and
   discharging the core cooling stream from the core plenum.

14. The method of claim 13, further comprising directing at least a portion of the core cooling stream through at least one impingement aperture toward a target surface.

15. The method of claim 13, further comprising directing at least a portion of the single peripheral cooling stream through at least one impingement aperture toward a target surface.

16. A cooled turbine blade comprising:
   a root for fixing the cooled turbine blade to a turbine rotor;
   an airfoil extending along a radial axis from the root, the airfoil defining a single aft airfoil cooling passage that extends radially through the airfoil proximate a trailing edge portion of the airfoil, wherein the single aft airfoil cooling passage is located within a distance of a trailing edge that is less than 25 percent of the airfoil chord length; and
   a tip shroud disposed at a radially outward end of the airfoil, extending in a circumferential direction from the airfoil, and defining, within the tip shroud, a core plenum and a peripheral plenum;
   the airfoil defining a single aft cooling inlet for providing a single aft stream of cooling fluid to the aft airfoil cooling passage and defining a single aft cooling exit for discharging the single aft stream of cooling fluid from the single aft airfoil cooling passage to the peripheral plenum, wherein an entire amount of the single aft stream directly routed to the peripheral plenum is routed through the single aft airfoil cooling passage;
   the core plenum being in fluid communication with the peripheral plenum; and
   one or more core airfoil cooling passages defined by the airfoil, each of the one or more core airfoil cooling passages extending radially through a core section of the airfoil, the airfoil defining a core cooling inlet for providing a core stream of cooling fluid to the one or more core airfoil cooling passages and defining at least one core cooling exit for discharging the core stream of cooling fluid from the one or more core airfoil cooling passages to the core plenum, wherein the aft cooling passage and the one or more core airfoil cooling passages are positioned to route the aft stream of cooling fluid and the core stream of cooling fluid to distinct plenums, wherein the one or more core airfoil cooling passages are located within a distance of a center of the airfoil that is less than 25 percent of the airfoil chord length.

* * * * *